G. W. HENRY, Jr.
PIN TICKETING MACHINE.
APPLICATION FILED SEPT. 23, 1916.

1,300,726.

Patented Apr. 15, 1919.
7 SHEETS—SHEET 1.

Inventor.-
George W. Henry, Jr.
by his Attorneys.—
Howson & Howson

G. W. HENRY, Jr.
PIN TICKETING MACHINE.
APPLICATION FILED SEPT. 23, 1916.

1,300,726.

Patented Apr. 15, 1919.
7 SHEETS—SHEET 3.

Inventor-
George W. Henry, Jr.
by his Attorneys-
Howson & Howson

G. W. HENRY, Jr.
PIN TICKETING MACHINE.
APPLICATION FILED SEPT. 23, 1916.

1,300,726.

Patented Apr. 15, 1919.
7 SHEETS—SHEET 6.

Inventor:
George W. Henry, Jr.
by his Attorneys:
Howson & Howson

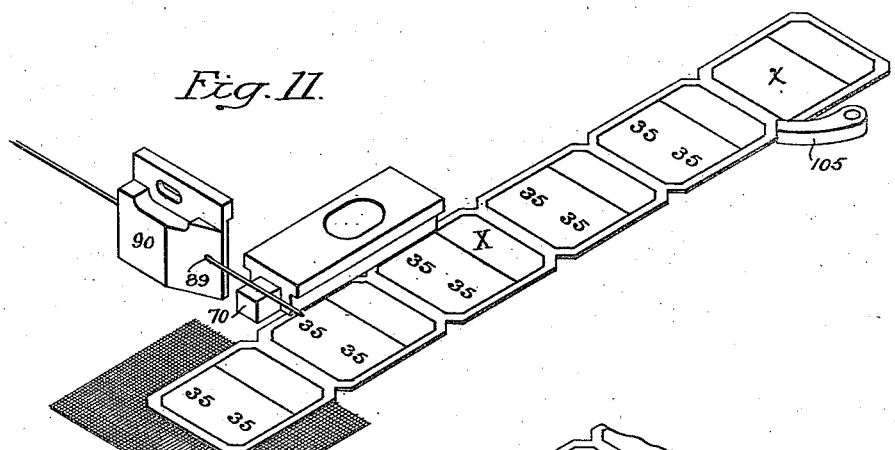
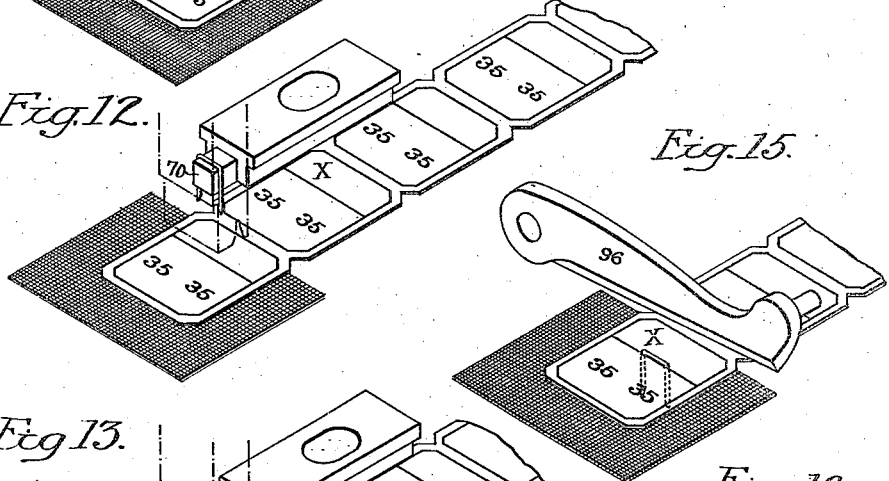
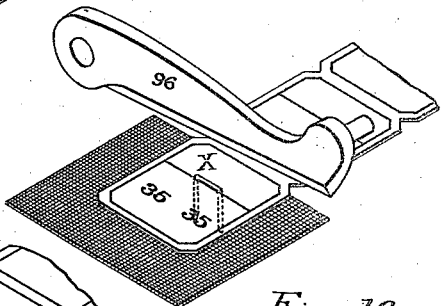
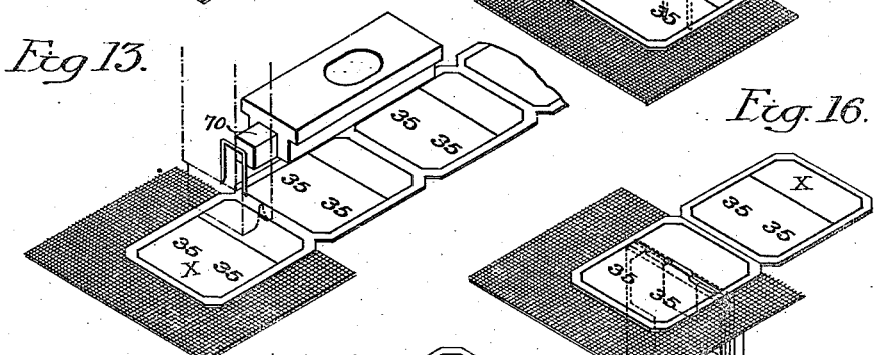
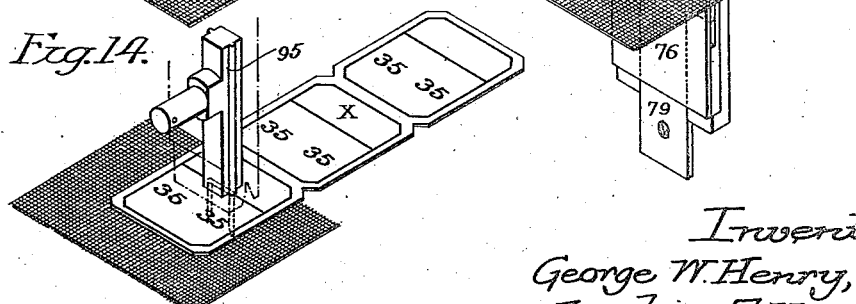

UNITED STATES PATENT OFFICE.

GEORGE W. HENRY, JR., OF PHILADELPHIA, PENNSYLVANIA, ASSIGNOR TO H. G. DAVIS MANUFACTURING COMPANY, OF PHILADELPHIA, PENNSYLVANIA, A CORPORATION OF PENNSYLVANIA.

PIN-TICKETING MACHINE.

1,300,726. Specification of Letters Patent. Patented Apr. 15, 1919.

Application filed September 23, 1916. Serial No. 121,769.

*To all whom it may concern:*

Be it known that I, GEORGE W. HENRY, Jr., a citizen of the United States, residing in Philadelphia, Pennsylvania, have invented certain Improvements in Pin-Ticketing Machines, of which the following is a specification.

This invention relates to certain improvements in machines for attaching pin tickets to fabrics, in which the mechanism is driven by power. The wire forming the pin is taken from a roll and bent simultaneously with the arrangement of the tag in proper position.

The invention is an improvement upon the patents granted to H. G. Davis, Nos. 715,032 of 1902; 864,157 of 1907; 1,048,136 of 1912 and 1,156,672 of 1915.

The object of the invention is to simplify the construction of certain details of the machine, and to so improve the construction of the machine that more perfect work is assured.

Referring to the accompanying drawings:—

Fig. 10, is a perspective view of the eccentric shifting fulcrum; and

Figs. 11 to 16, are diagram views showing the different steps in the process of forming the staple and the manner of applying it to the tag and fabric.

Figure 1:
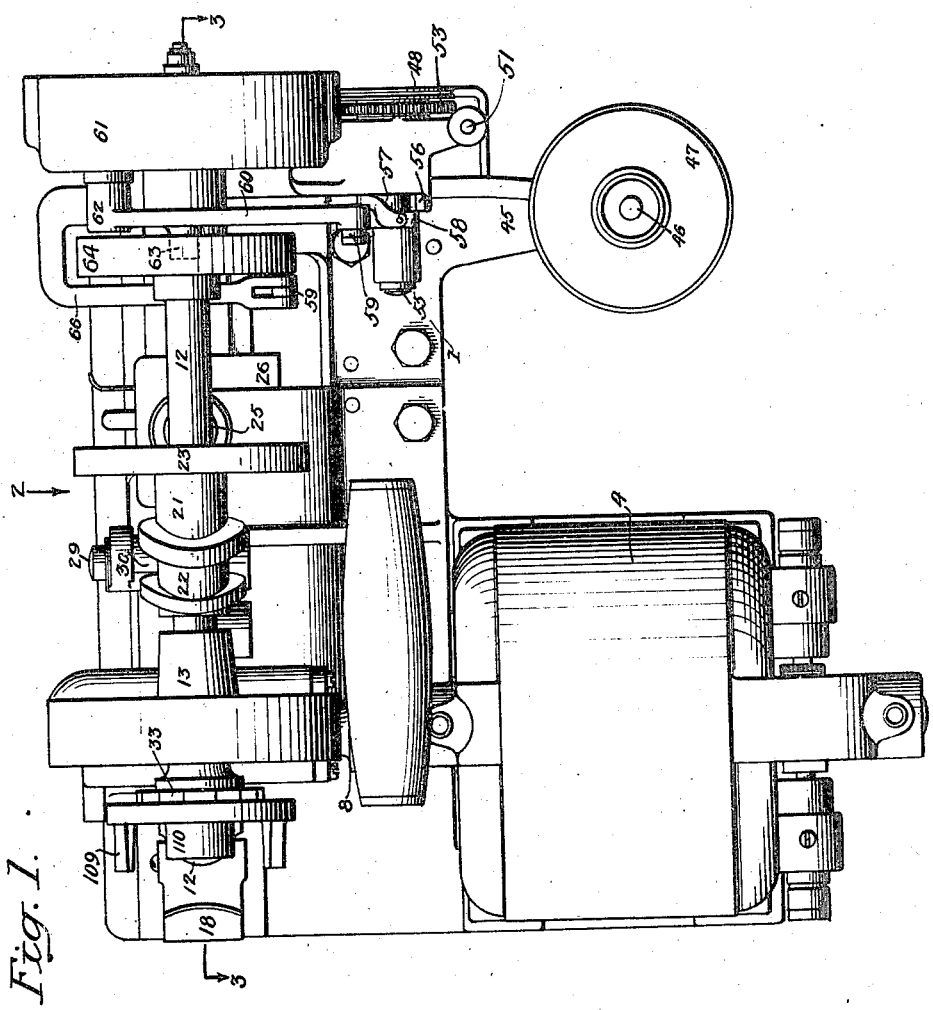
Figure 1, is a plan view of my improved pin ticketing machine.
Figure 2:
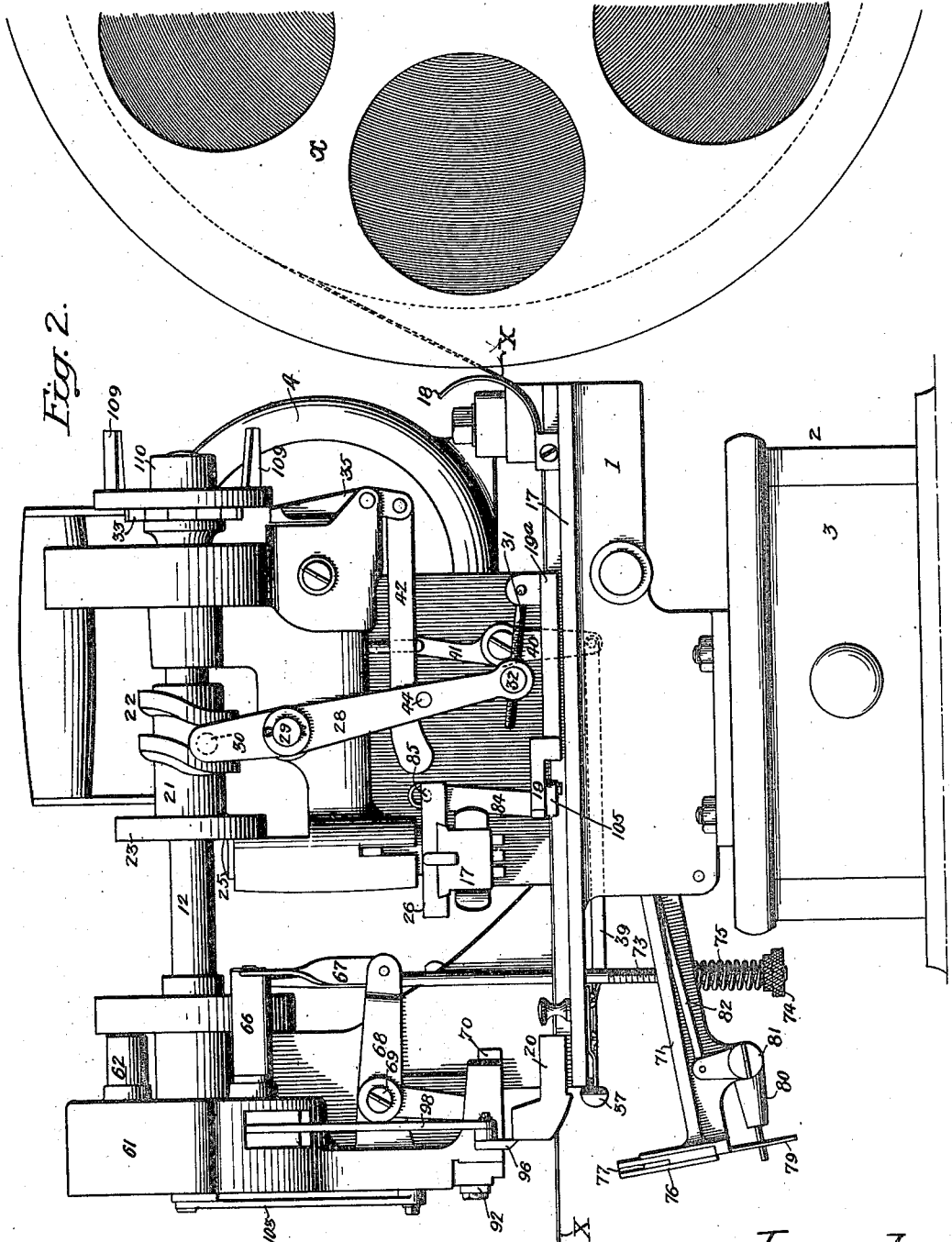
Fig. 2, is a side view looking in the direction of the arrow 2, Fig. 1.
Figure 3:
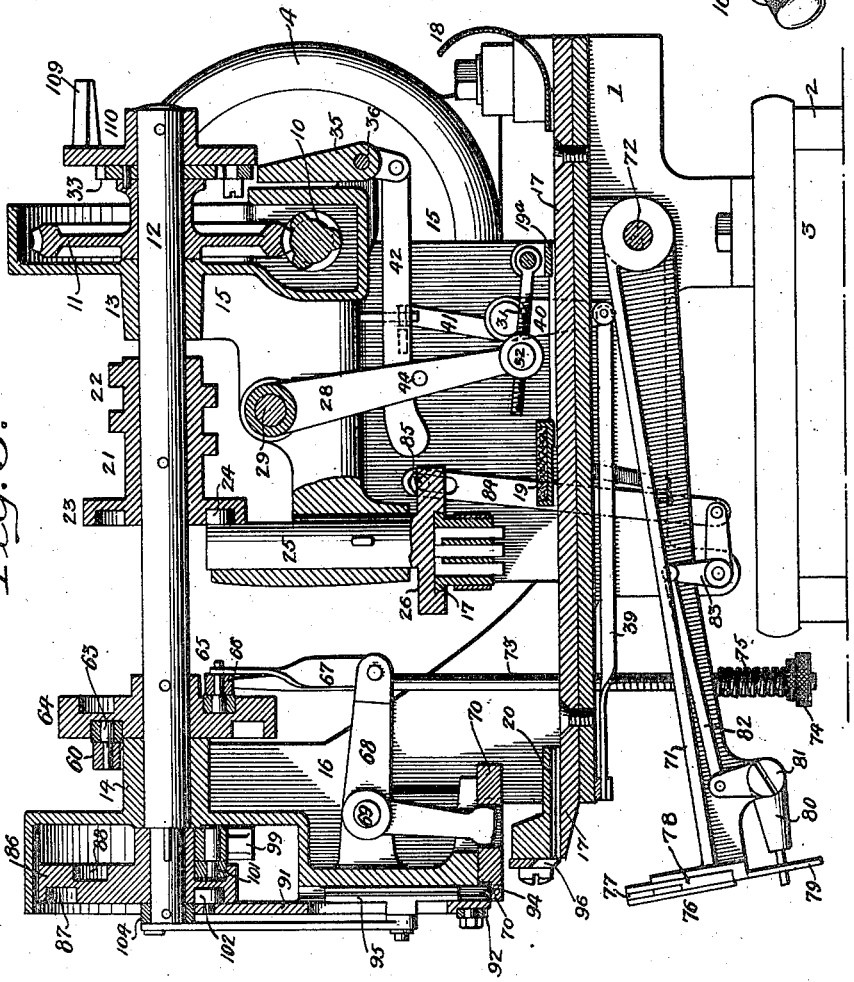
Fig. 3, is a longitudinal sectional view on the line 3—3, Fig. 1.
Figure 4:
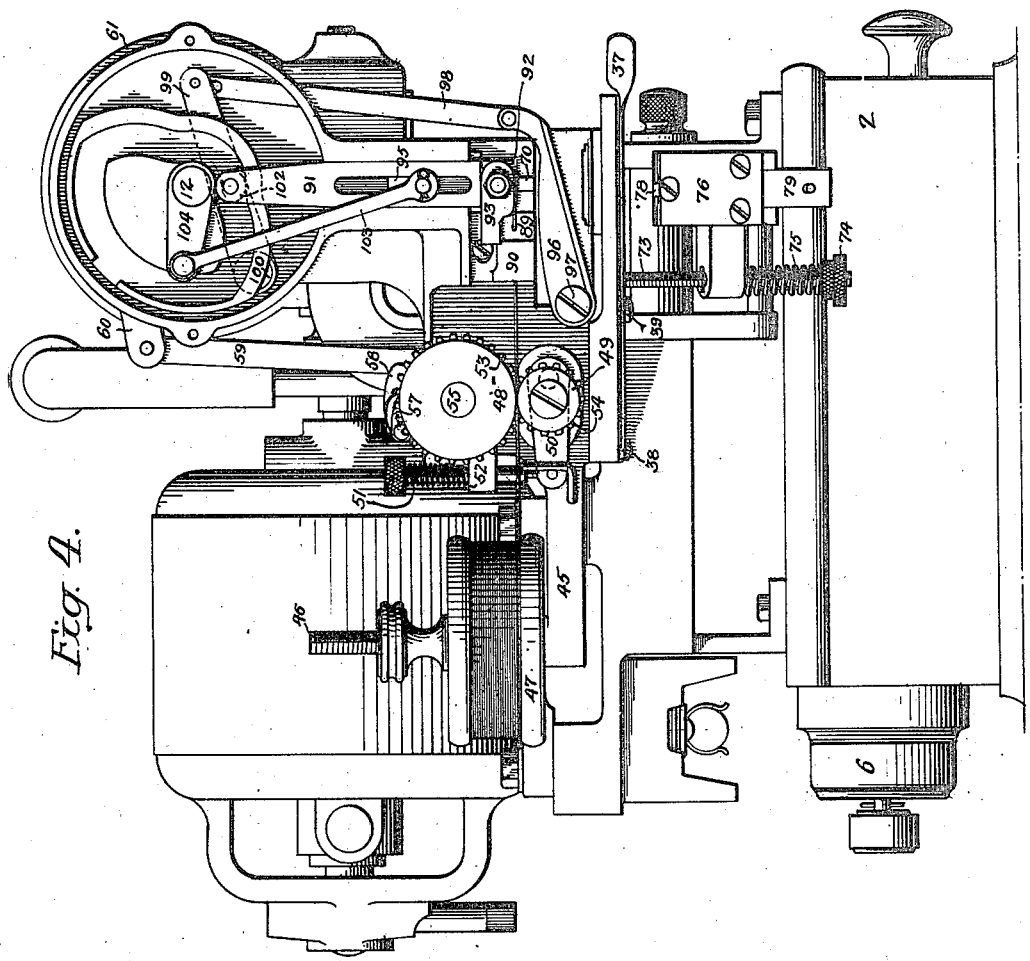
Fig. 4, is a view looking at the front end of the machine.
Figure 5:
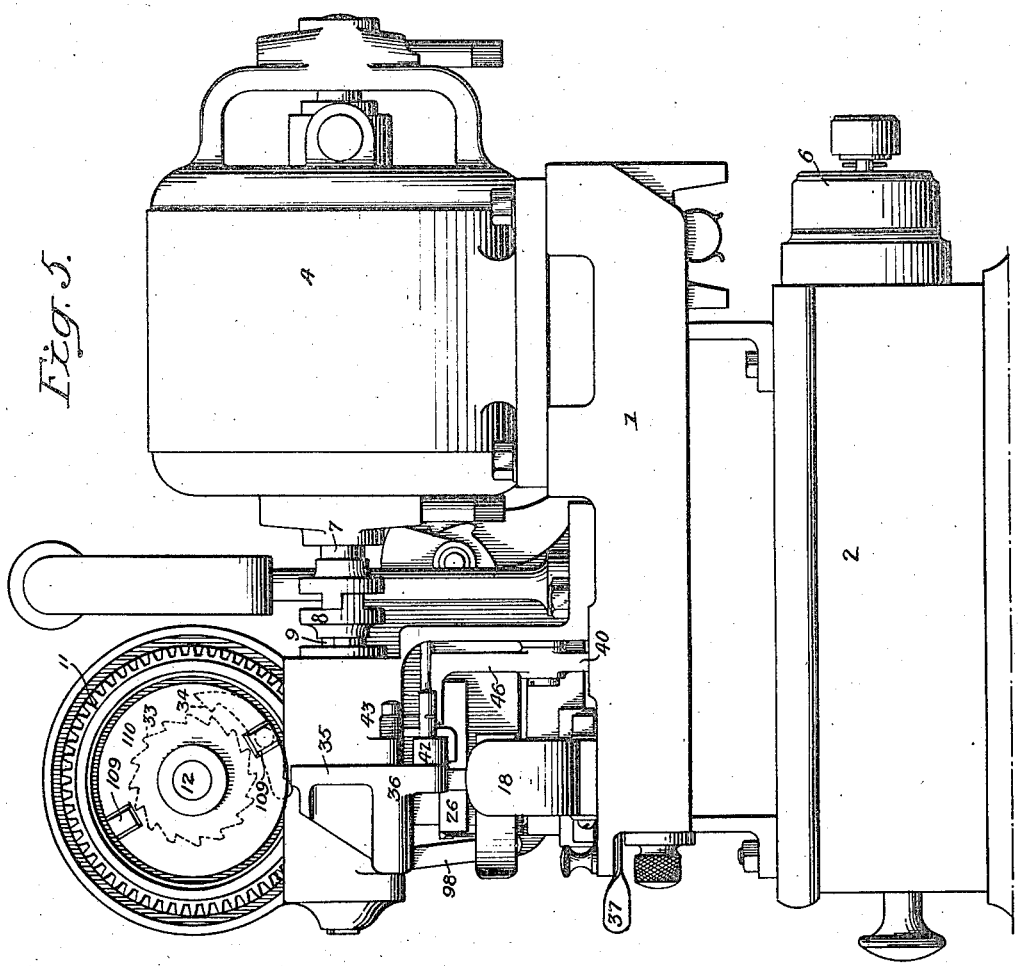
Fig. 5, is a view looking at the rear end of the machine.
Figure 6:
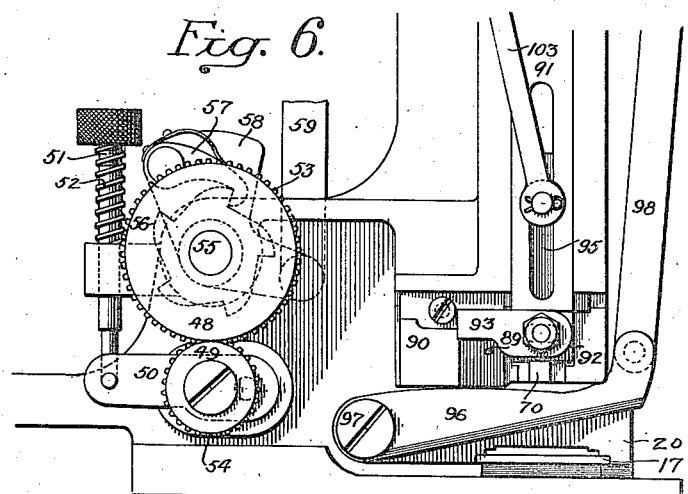
Figs. 6, 7 and 8, are views looking at the front of the machine, showing the mechanism in three different positions.
Figure 8:
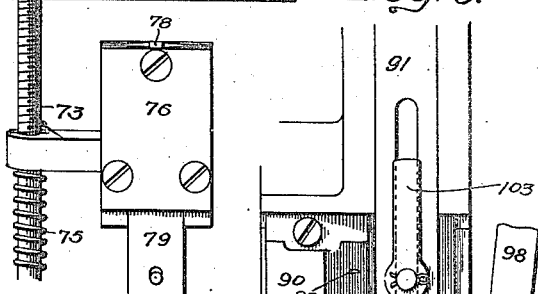
Figure 7:
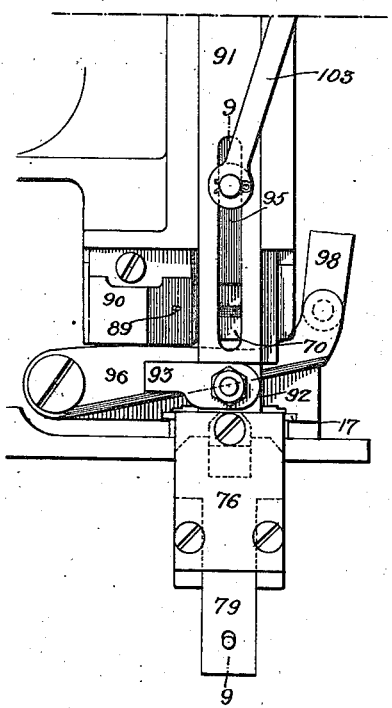
Figure 9:
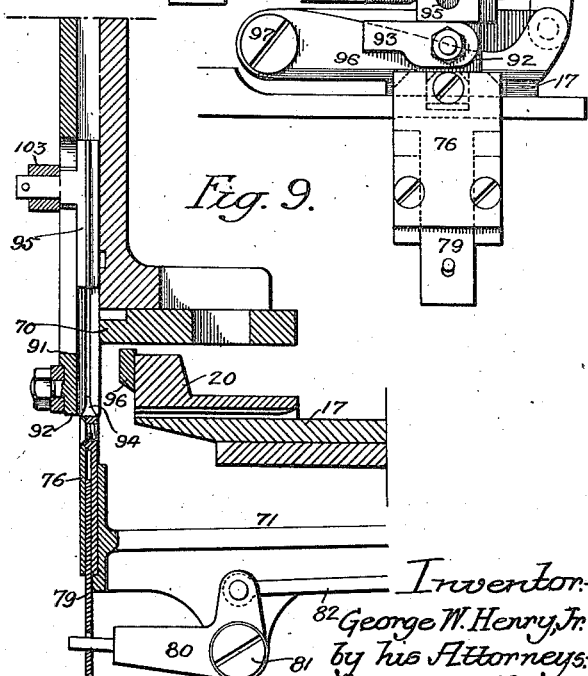
Fig. 9, is a sectional view on the line 9—9, Fig. 7.

1 is the base of the machine mounted on a suitable stand 2, in the present instance containing a drawer 3 for the type used in marking the tag. On the base 1 is secured the motor 4. In the present instance this motor is an electric motor and driven from any source of current supply. 6 is an electric switch for turning on and off the current to the motor.

Coupled directly to the armature shaft 7 of the motor, through a clutch 8, is a shaft 9 on which is a worm 10 meshing with a worm wheel 11 on a longitudinal shaft 12 adapted to bearings 13 and 14 projecting from the base 1. The bearing 13 forms part of a frame 15, and the bearing 14 forms part of a forward frame 16, both secured to the base 1 in the present instance.

On the base is a bed plate 17 over which the tag strip X travels; above this bed plate is a rear guide 18, a feeding slide 19ª and a forward guide 20. The strip X passes from the reel $x$ under the rear guide 18 and feeding slide 19ª, which has pawls 105 arranged to engage the strip and which also carries the inking pad 19, and under the forward guide 20.

On the shaft 12 is attached a hub 21 having a scroll cam 22 and a face cam 23 formed integral therewith. A pin 24 on the upper end of a plunger 25 extends into the cam 23 and the plunger is controlled by said cam. At the lower end of the plunger is a head 26 carrying a type frame, which has an undercut recess to receive the type chase, somewhat similar in construction to the frame of one of the above mentioned patents. This head makes two reciprocating movements at each revolution of the tag strip. The pad 19 slides on the base 1, being guided by the plate 17, and moves to a position first under the chase and then to one side of it, so that the type carried by the chase are first inked and then make the impression. The movement of this ink pad is controlled by the scroll cam 22. A lever 28 is pivoted at 29 to the frame, and the short arm carries a pin 30 which enters the groove in the cam 22. The long arm of the lever is adjustably connected to the feeding slide 19ª carrying the pad 19, by a screw rod 31 which passes through a nut 32 on the arm 28, so that on turning the screw rod in the nut the location of the pad in respect to the type can be adjusted.

In order that the shaft 12 will make one revolution and then stop, I secure a hug to the worm wheel 11 and a ratchet wheel 33, and engaging this ratchet wheel is a pawl 34 released by a tripper 35 pivoted at 36, and this arm, when in position, will trip the pawl and stop the rotation of the shaft 12 at each revolution.

In order to start the shaft the operator must press a finger lever 37 at the forward end of the machine, and this lever is pivoted at 38 and is connected to a bar 39 pivoted in front to a lever 40 having an arm 41 which engages the loosely pivoted arm 42 connected to the short arm of the tripper 35. A light spring 43 tends to hold the tripper in its active position.

The arm 42 rests on a pin 44 on the lever 28 and when this lever is moved forward it lifts the arm, due to the formation of its end, so as to relieve it from the control of the finger lever and the mechanism will automatically stop at each revolution.

Mounted on a bracket 45 to one side of the forward frame 16, is the spindle 46 on which is mounted the spool of wire 47 from which the staple or pin is made. 48 is a grooved wheel and 49 is a plain wheel which acts as a presser for holding the wire in the groove of the wheel 48. This presser wheel is mounted on a pivoted lever 50 to which is connected an adjusting screw 51 on which is mounted a coiled spring 52, so that the pressure of the presser wheel 49 against the wire can be regulated. Both wheels are driven, being geared together, the wheel 48 having a gear wheel 53 and the presser wheel having a pinion 54 meshing with said gear wheel.

On the opposite end of the shaft 55 on which the wheel 48 is mounted, is a ratchet wheel 56, with which a spring pawl 57 engages; this pawl being pivoted to an arm 58 loose on the shaft and connected to this arm is a rod 59, connected in turn to an arm 60 pivoted to the casing 61 at 62 and having a pin 63 which enters a slot in one face of the cam 64 secured to the shaft 12; into the opposite face projects a pin 65 on a lever 66 pivoted to the casing 61, and connected to this lever by a rod 67 is a bell-crank lever 68 pivoted at 69, and one arm of this bell-crank lever 68 engages a sliding anvil 70, over which the wire is bent to U-shape form to move it into and out of position.

The lever 66 also controls the movement of the means for flattening the wire after it has passed through the tag and fabric. This mechanism consists of a long arm 71 mounted on an eccentric pivot 72 forming an eccentric fulcrum and controlled by the cam 64 through the lever 66; a rod 73 which passes through a lug on the arm 71 has an adjustable nut 74 between which and the lug is a spring 75, so that there is a yielding pressure of the arm against the fabric.

At the outer end of the arm 71 is a plate 76, slotted at each side as at 77, the slots being separated by a fixed portion 78. The portions of the pin projecting through the fabric enter these slots in the plate, and are pressed down flat against the fabric by a plunger 79 adapted to slide in the plate and controlled by a bell-crank lever 80 pivoted at 81 to the arm 71 and connected by a rod 82 to a bell-crank lever 83 pivoted to the base of the machine. One arm of this bell-crank lever is connected to a bar 84 slotted at its outer end to receive a pin 85 on the head 26 of the plunger 25, so that when the type makes an impression the plunger 79 is raised and the projecting points of the U-shaped pin are flattened out against the fabric.

On the forward end of the shaft 12 is a cam 86 having a cam groove 87 in one face and a cam groove 88 in the other face. The wire passes through a hole 89 in a guide block 90 secured to the base of the machine, and a slide 91 is adapted to guides in the frame 16 and carries at its lower end a head 92 which has a portion 93 which travels close to the beveled portion of the guide block 90 and acts as a shear to cut the wire which projects through the hole 89, and in the under face of this head is a V-shaped groove 94 which receives the cut portion of the wire.

When the head is in its raised position, the wire is projected into this groove, so that when the head descends it cuts off this projecting portion and bends it over the anvil 70, and on the withdrawal of the anvil, as the ticket is clamped to the fabric by the head 92, a plate 76 forming the jaws, and plunger 95 are moved down simultaneously with the retraction of the anvil and force the U-shaped pin through the cardboard ticket and through the fabric, while, on the continued movement of the machine, the plunger 79 in the plate 76 forming the lower jaw is moved upward and flattens the projecting ends of the pin against the fabric.

Simultaneously with the movement of the plunger to force the pins into the fabric, the individual ticket is cut from the strip by a knife 96 pivoted at 97. This knife is connected by a rod 98 to an arm 99 pivoted at 100 to the casing 61, and has a pin 101 which extends into the cam groove 88 of the cam 86.

The slide 91 carrying the head 92 has a pin 102 which enters the cam slot 87 in the cam 86, while the plunger 95, which drives the pin or staple into the tag and fabric, is connected by a rod 103 to a crank arm 104 secured to the shaft 12.

It will be noticed, on referring to Fig. 11, that the tag strip is notched at intervals on the dividing lines of the several tags. This not only gives a finish to the tag, but the notch is utilized to feed the tag strip forward and on the bottom of the inking pad 19 carried by the feeding slide 19ª, are two spring pawls 105, one on each side of the bed plate 17, on which the tag strip is mounted. These pawls are so pivoted as to enter the notches in the tag strip and feed it forward, but will return over the tag strip as the strip is held by the mechanism at the forward end of the machine while the feeding slide is returning to its first position.

In some instances, it is desirable to simply place the pins in the tickets so that they can be applied to the fabric after leaving the machine, and I have provided a shifting fulcrum 72, Fig. 10, having an eccentric portion 106 which carries the arm 71, and on the flange 107 is a pin 108 adapted to one of two holes in the base 1, so that by pulling the fulcrum by grasping the knurled head, the fulcrum can be turned so that the pin will enter one or the other of the two holes. In one position the arm is projected so as to be in alinement with the mechanism of the machine, and in the other position it is retracted so as to clear the mechanism of the machine.

The operation of the machine is as follows:—The strip X is fed from the roll by the pawls 105 engaging the notches of the strip; the end of the strip is fed the distance of a tag. After this feeding operation, a portion of the tag strip is printed, while another portion is positioned to receive the pin or staple and to be severed from the remainder of the strip. In the meantime, the wire has been projected a given distance through the hole 89, Fig. 11, has been cut off by the head 92 and bent over the anvil 70, as in Fig. 12. The anvil is then withdrawn, and in the meantime the fabric has been placed in position under the tag by the operator, and the parts have been clamped by the two jaws formed by the head 92 and the plate 76. The plunger 95 then forces the U-shaped staple or pin through the ticket and the fabric; the plunger 79 in the lower jaw is elevated so as to press the projecting ends of the pin out against the fabric.

The machine stops automatically at each revolution and can be started by the operator pushing the finger lever 37, referred to above. The machine can be turned by hand by engaging the projecting lugs 109 on the disk 110, which carries the pawl 33 and which is secured to the shaft 12.

I claim:—

1. The combination in a machine for attaching tickets to goods, of a bed plate over which the strip of tickets travels; a type form; means for operating the form; means for inking the type; means for cutting the strip after a ticket has been projected from one end of the machine; a staple forming means at the end of the machine; a reel for the wire; means for feeding the wire from the reel to the staple forming means; a guide block located between the feeding mechanism and the staple forming means and through which the wire passes, the parts, with the exception of the guide block, being arranged so as to expose the wire to the view of the operator; and means for driving the formed staple through the ticket and the material to which the ticket is to be secured.

2. The combination in a machine for attaching tickets to goods, of means for moving the strip of tickets intermittently forward; means for printing the tickets; means for cutting the tickets from the strip; means for cutting and shaping the wire and forcing it through a ticket; a shaft controlling the movement of the several parts; a wheel loose on the shaft; means for controlling the wheel; a ratchet wheel carried by the said loose wheel; a disk secured to the shaft and having a pawl engaging the ratchet wheel; a finger lever; a tripper connected to the finger lever and arranged to trip the pawl so as to start the machine, the pawl being engaged by the tripper after it has completed one revolution, so as to throw the pawl out of engagement with the ratchet wheel and thus stop the rotation of the shaft controlling the mechanism of the machine.

3. The combination in a machine for attaching tickets to goods, of a bed plate over which the ticket strip is fed; a feeding slide; an ink pad thereon; pawls on the slide engaging the ticket strip and arranged to feed it forward; a lever connected to the slide; a shaft; means for driving the shaft; a cam on the shaft for controlling the movement of the lever, a plunger mounted in the frame of the machine and having a head; a chase carried by the head and containing the type to print the tickets; a cam on said shaft for reciprocating the plunger; an arm pivoted to the bed of the machine and carrying a plate at its outer end into which the projecting ends of the pin are extended; a plunger near the plate arranged to press the projecting ends of the pin against the goods; means for operating the arm; a bell crank lever engaging the plunger in the plate; a second bell crank lever pivoted to the frame of the machine and connected to one of the arms of the first mentioned bell crank lever; a bar connected to the last mentioned bell crank lever and having a slot at its upper end; a pin on the head of the type-carrying plunger extending into the slot and actuating the plunger and the plate through the bell crank levers; and means for cutting and forming a wire pin arranged in time with the other mechanism of the machine.

GEORGE W. HENRY, JR.